US008687276B2

(12) United States Patent
Cho et al.

(10) Patent No.: US 8,687,276 B2
(45) Date of Patent: *Apr. 1, 2014

(54) OPTICAL SYSTEM WITH OPTICAL IMAGE STABILIZATION USING A MEMS MIRROR

(75) Inventors: Gyoung Il Cho, Seoul (KR); Hye Young Kim, Jeonbuk (KR); Cheong Soo Seo, Seongnam (KR)

(73) Assignees: Stereo Display, Inc, Anaheim, CA (US); Angstrom, Inc, Seongnam (KR)

( * ) Notice: Subject to any disclaimer, the term of this patent is extended or adjusted under 35 U.S.C. 154(b) by 508 days.

This patent is subject to a terminal disclaimer.

(21) Appl. No.: 12/692,519

(22) Filed: Jan. 22, 2010

(65) Prior Publication Data

US 2011/0181955 A1    Jul. 28, 2011

(51) Int. Cl.
G02B 27/64 (2006.01)
G02B 26/08 (2006.01)
(52) U.S. Cl.
CPC ............ *G02B 27/64* (2013.01); *G02B 26/0833* (2013.01)
USPC ........................................ 359/554; 359/224.1

(58) Field of Classification Search
USPC ............................ 359/554–557, 237–291, 838
See application file for complete search history.

(56) References Cited

U.S. PATENT DOCUMENTS

| 6,025,951 | A  | * | 2/2000 | Swart et al. | 359/245 |
| 7,173,653 | B2 | * | 2/2007 | Gim et al. | 348/208.7 |
| 2005/0264867 | A1 | * | 12/2005 | Cho et al. | 359/291 |
| 2009/0185067 | A1 | * | 7/2009 | Cho et al. | 348/345 |
| 2011/0075015 | A1 | * | 3/2011 | Cho et al. | 348/345 |

* cited by examiner

*Primary Examiner* — Thong Nguyen

(57) ABSTRACT

An optical system with optical image stabilization of the present invention compensates the movement of the optical system occurring during imaging process using a Micro-Electro Mechanical System (MEMS) unit having an MEMS mirror to stabilize an image of an object formed on an image plane. A micro-actuator with the in-plane translation makes the MEMS mirror have a required rotation to change optical paths of light from the object to the image plane for optical image stabilization. The optical system with optical image stabilization or the present invention provides fast speed, light weight, simple operation, and high image quality image stabilization for the optical system.

25 Claims, 15 Drawing Sheets

OPTICAL SYSTEM WITH OPTICAL IMAGE STABILIZATION USING A MEMS MIRROR

FIELD OF THE INVENTION

The present invention relates to an optical system in general and more specifically to an optical system with optical image stabilization.

BACKGROUND OF THE INVENTION

Optical systems such as lens modules, still cameras, video cameras, telescopes and other portable imaging devices are prone to have a movement during imaging process. The movement of the optical systems can come from many sources including hand shaking (e.g. in still or video cameras), environmental vibration (e.g. in moving vehicles), and/or earth's rotation (e.g. in astronomical applications). These movements can cause a critical problem especially in long exposure time (low light condition) or with long focal length setting (telephoto) by resulting in severely blurred images.

Various approaches for image stabilization have been developed in order to compensate the movement of the optical system occurring during the imaging process. These include mechanical image stabilization, optical image stabilization, and digital image stabilization. In the mechanical image stabilization, the image sensor is moved with respect to the camera body to counteract the movement of the optical system. On the other hand, in the optical image stabilization, the optical path of light is changed by using movable lenses, floating lenses, or variable angular prisms to compensate the movement of the optical system. The movement of the optical system can be detected by conventional angular velocity detection sensors such as vibration gyros, MEMS (Micro-Electro Mechanical System) sensors, and piezoelectric sensors.

FIGS. 1 and 2 show conventional optical image stabilization devices. FIGS. 1a-1c are schematic diagrams showing a conventional optical image stabilizing device using a movable lens. In FIGS. 1a-1c, the optical system 11 (e.g. still cameras, video cameras, or other type of imaging devices) includes an optical image stabilization device. The optical image stabilization device 11 comprises a lens 12 configured to change the optical path 13 of light to an image sensor 14. FIG. 1a shows the optical system 11 having no movement during the imaging process. The optical system 11 with no movement produces a clear image A. FIG. 1b shows the optical system 11 having movement during the imaging process but without movement compensation. Since there is no movement compensation, the optical system 11 produces a blurred image on the image sensor 14 since the image traverses across the image sensor (from A to B) FIG. 1c shows the optical system 11 with movement, wherein the movement compensation is in operation. To compensate the movement of the optical system 11, the optical image stabilization device measures the movement of the optical system 11 using one or two angular velocity sensors and controls the lens 12 to have a proper movement (e.g. up, down, left, or right) to adjust the optical paths 13 of light in accordance with measured movement information. By adjusting the optical paths 13 of light, the image C remains clear on the image sensor 14 during the imaging process. In the conventional optical image stabilization devices, the lens 13 is moved macroscopically by coil motors or electromagnetic attraction.

FIGS. 2a-2c are schematic diagrams showing another type of conventional optical image stabilizing device using a variable angle prism. The optical system 21 includes an optical image stabilization device. The optical image stabilization device comprises a variable angle prism 22 configured to change the optical paths 23 of light to an image sensor 24. FIG. 2a shows the optical system 21 with no movement during the imaging process. The optical system 21 with no movement produces a clear image A. FIG. 2b shows the optical system 21 with the movement during the imaging process but without movement compensation. Since there is no movement compensation, the optical system 21 produces a blurred image on the image sensor 24 since the image traverses across the image sensor (from A to B). FIG. 1c shows the optical system 21 with movement during the imaging process, wherein the movement compensation is in operation. To compensate the movement of the optical system 21, the optical image stabilization device measures the movement of the optical system 21 using one or two angular velocity sensors and controls the variable angle prism 23 to have a proper shape change to adjust the optical paths 23 of light in accordance with measured movement information. By adjusting the optical paths 23 of light, the image C remains clear on the image sensor 24 during the imaging process.

These conventional image stabilizing devices involve with macroscopic movement or macroscopic shape change of lenses, prisms, or image sensors. The macroscopic movement or macroscopic shape change of the optical elements can cause the optical system to have slow response time, increased volume and weight, complex structure and operation, and eventually low image quality. The present invention resolves these problems of conventional optical image stabilizing devices by using the MEMS technology. The MEMS optical image stabilizing device of the present invention provides fast speed, light weight, simple operation, and high image quality image stabilization for the optical system.

SUMMARY OF INVENTION

The optical system with optical image stabilization of the present invention are contrived to provide fast speed, light weight, simple operation, and high image quality image stabilization for the optical system.

An optical system with optical image stabilization of the present invention comprises at least one movement determination unit determining a movement of the optical system, a control circuitry generating a movement compensation signal using the movement information of the optical system from the movement determination unit, and a Micro-Electro Mechanical System (MEMS) unit made by microfabrication technology and controlled by the control circuitry with the movement compensation signal to stabilize an image of an object formed on the image plane. The MEMS unit comprises a substrate, an MEMS mirror movably connected to the substrate and configured to have a motion comprising a rotation, and at least one actuation unit configured to actuating the MEMS mirror. The actuation unit comprises a micro-actuator disposed on the substrate, communicatively coupled to the control circuitry, and configured to have in-plane translation in accordance with the movement compensation signal and a micro-converter having a primary end rotatably connected to the micro-actuator. The micro-actuator with the in-plane translation exerts a force on the primary end of the micro-converter and the micro-converter delivers the force to the MEMS mirror to make the MEMS mirror have a required rotation. The rotation of the MEMS mirror changes optical paths of light from an object to an image plane in order to stabilize an image of the object formed on the image plane.

The micro-converter can be rotatably connected to the MEMS mirror. Alternatively, the micro-converter can be configured to push the MEMS mirror to have the motion.

In one embodiment, the micro-converter comprises at least one beam, wherein a first end of the beam is the primary end and a second end of the beam is rotatably connected to the MEMS mirror.

In another embodiment, the micro-converter comprises a first beam and a second beam. A first end of the first beam is the primary end, a second end of the first beam is rotatably connected to a first end of the second beam, and a second end of the second beam is rotatably connected to the substrate. The MEMS mirror is pushed by a pivot point connecting the second end of the first beam and the first end of the second beam in order to have the motion.

The MEMS mirror can be rotatably connected to the substrate. Alternatively, the micro-converter can be rotatably connected to the substrate.

The MEMS unit further comprises at least one flexible member connecting the MEMS mirror and the substrate and providing restoring force to the MEMS mirror.

The micro-actuator can be at least one comb-drive.

The MEMS unit comprises a plurality of the at least one actuation units. Each of the micro-actuators in the plurality of the at least one actuation units can be driven independently by the control circuitry.

The optical system with optical image stabilization further comprises a lens unit comprising at least one lens having an object side and an image side, disposed between the MEMS unit and the image plane such that the MEMS unit is positioned on the object side of the lens unit, and configured to focus the light from the object.

The optical system with optical image stabilization further comprises an auxiliary lens unit comprising at least one lens and disposed between the object and the MEMS unit.

The optical system with optical image stabilization further comprises a reflective element disposed between the MEMS unit and the image plane.

The reflective element can be a mirror configured to fold the optical paths of the light, which makes the optical system compact.

The reflective element is movable and configured to adjust the focus of the optical system. The movable reflective element can be a Micromirror Array Lens, wherein the Micromirror Array Lens is a variable focus lens configured to change the effective focal length of the optical system, wherein the Micromirror Array Lens comprises a plurality of micromirrors and changes the effective focal length of the optical system by controlling the motions of the micromirrors. In addition, the Micromirror Array Lens can compensate aberrations of the optical system by controlling the motions of the micromirrors.

The movable reflective element can be a second MEMS unit, wherein the second MEMS unit comprises at least one MEMS mirror having a motion comprising an out-of-plane translation and is configured to change a distance between the object and the image plane by controlling the out-of-plane translation of the MEMS mirror. The MEMS mirror in the second MEMS unit can be configured to have a rotation in order to compensate focus shift.

The optical system with optical image stabilization further comprises at least one focus measurement unit determining focusing status and providing focusing status information for the movable reflective element in order to adjust the focus of the optical system automatically.

The optical system with optical image stabilization further comprises at least one image sensor disposed on an image side of the MEMS mirror such that the image of the object is formed on the image sensor and configured to convert the image of the object to an electrical signal. The optical system with optical image stabilization further comprises an image processing unit communicatively coupled to the image sensor and analyzing the image data from the image sensor. The image sensor with the image processing unit can be used as the movement determination unit. Also, the image sensor with the image process unit can be used as the focusing status determination unit.

The optical system with optical image stabilization can further comprise a beam splitter positioned between the object and the MEMS mirror. Also, the optical system with optical image stabilization can further comprise a beam splitter positioned between the reflective element and the image plane.

In the optical system with optical image stabilization of the present invention, the movement compensation signal is binary.

Although the present invention is briefly summarized, the full understanding of the invention can be obtained by the following drawings, detailed description, and appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The optical device with optical image stabilization of the present invention compensates the movement of the optical system occurring during imaging process to improve image quality.

Figure 1A:
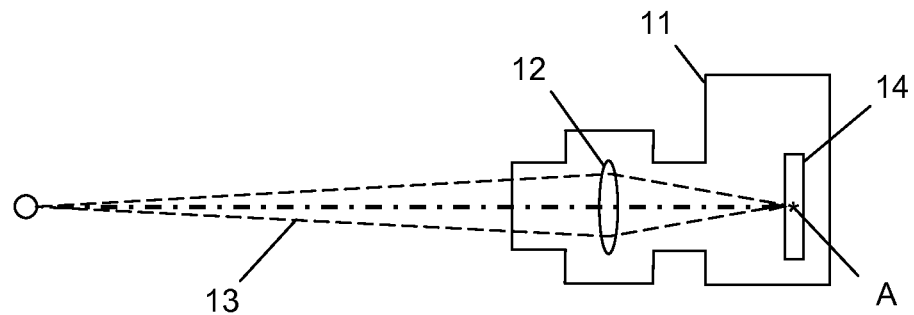
FIGS. 1a-1c are schematic diagrams showing a conventional optical image stabilizing device using a movable lens.
Figure 1B:
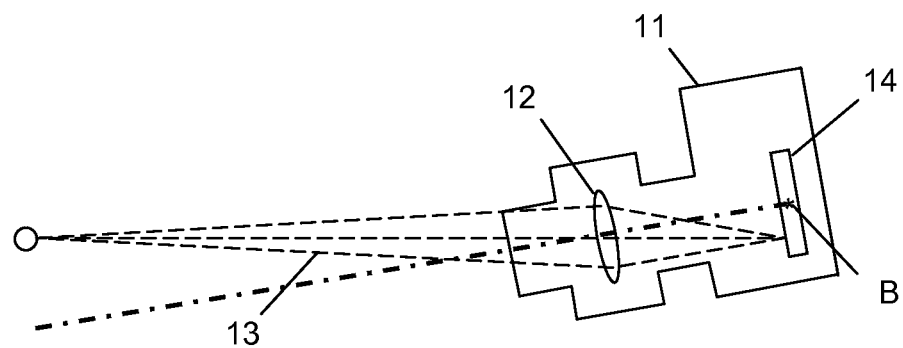
Figure 1C:
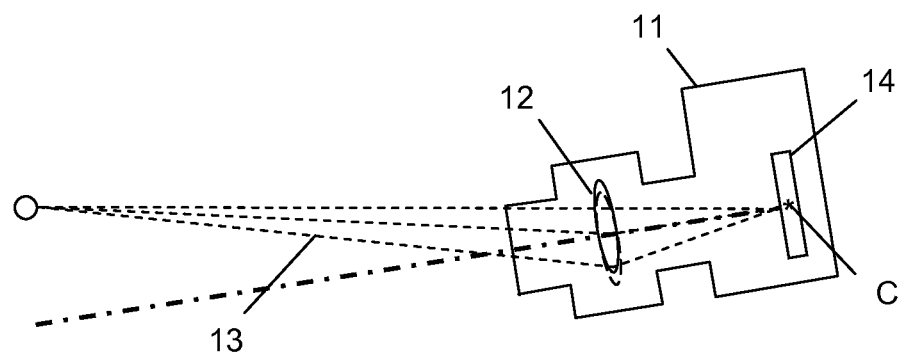
Figure 2A:
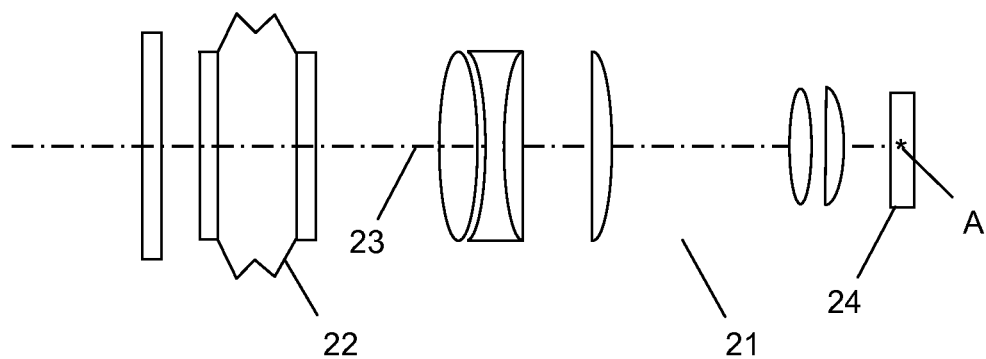
FIGS. 2a-2c are schematic diagrams showing another type of conventional optical image stabilizing device using a variable angle prism.
Figure 2B:
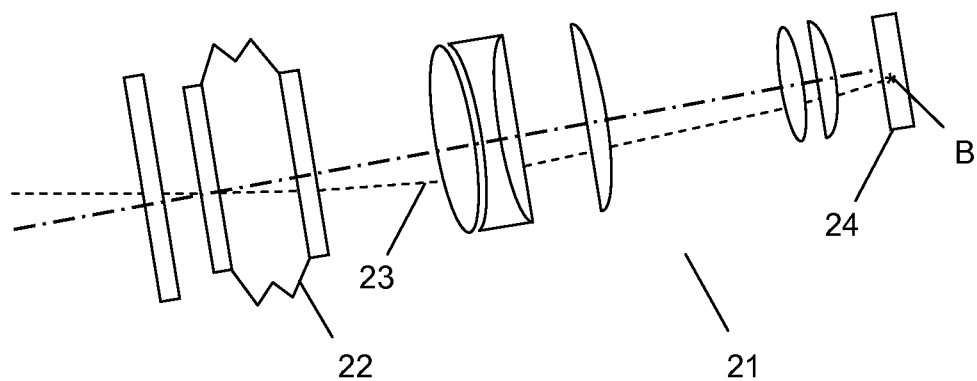
Figure 2C:
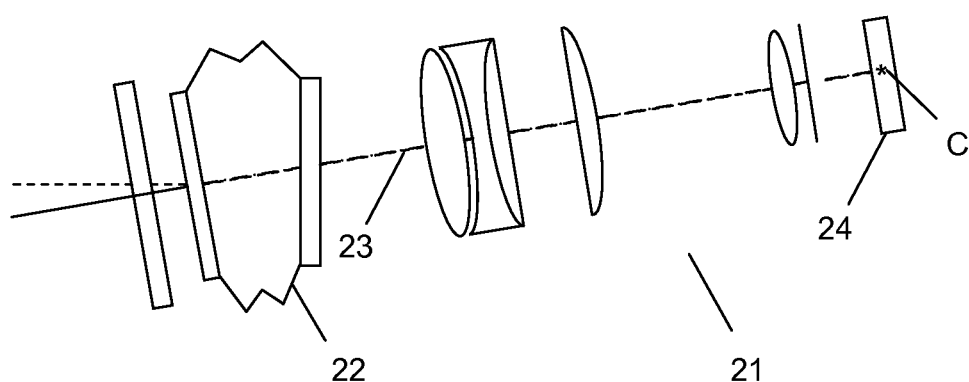
Figure 3A:
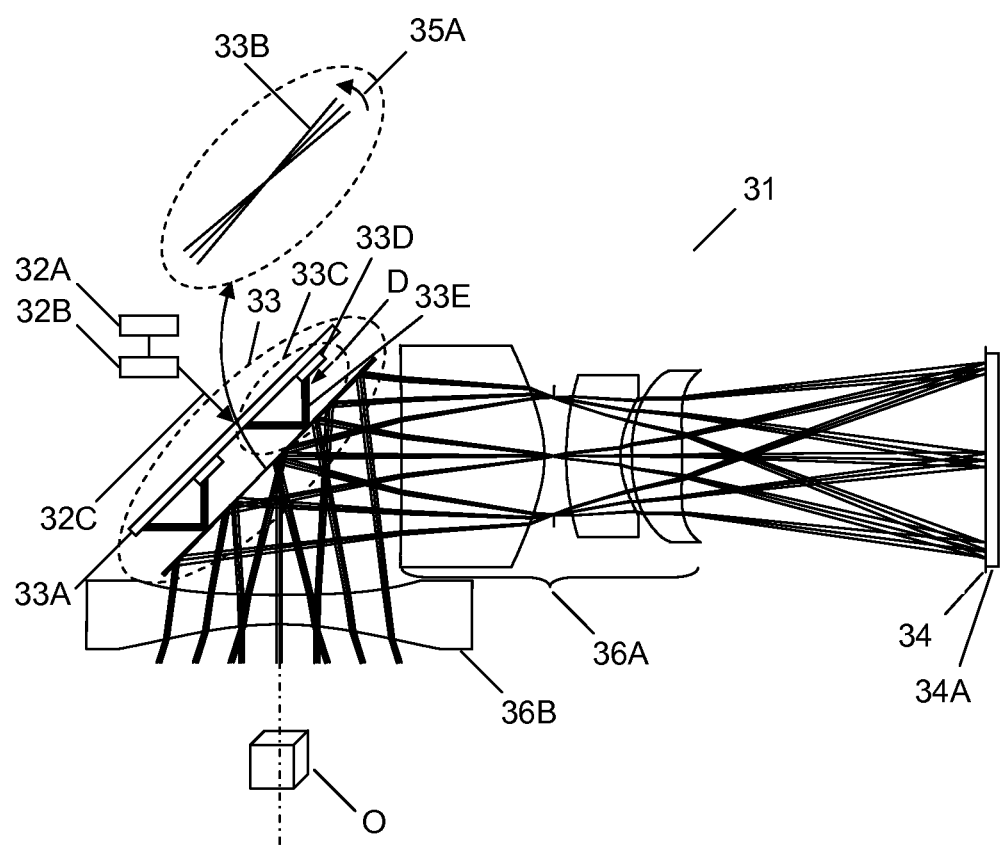
FIGS. 3a-3c are schematic diagrams showing embodiments of an optical system with optical image stabilization.
Figure 3B:
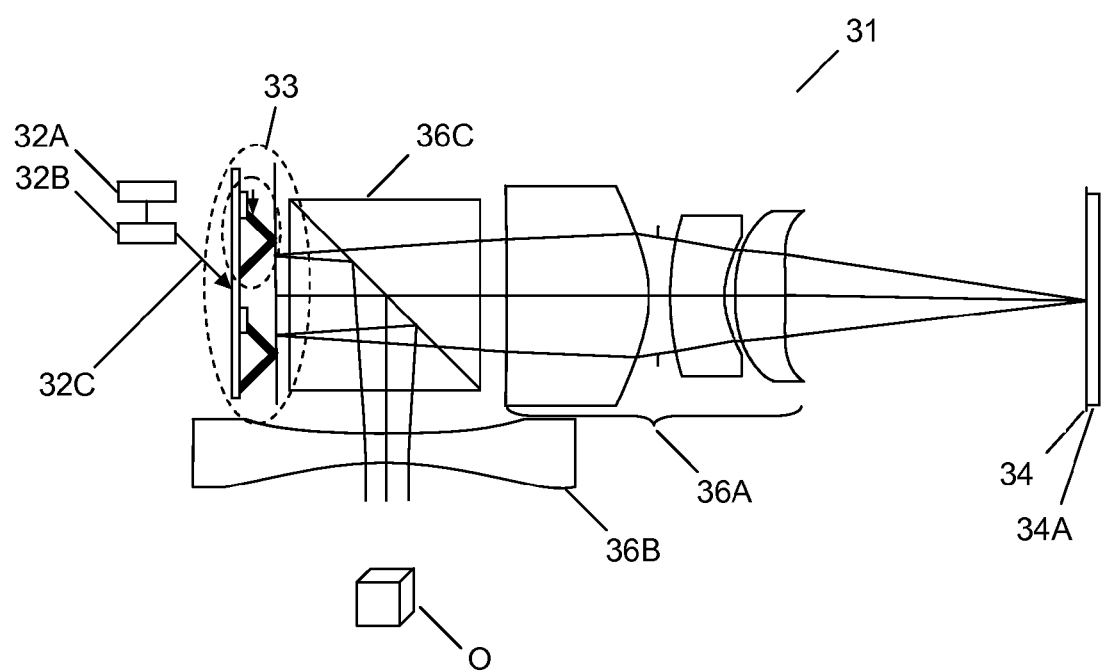

FIGS. 3a-3b are schematic diagrams showing embodiments of an optical system with optical image stabilization of the present invention. As shown in FIG. 3a, the optical system 31 with optical image stabilization comprises at least one movement determination unit 32A determining a movement of the optical system 31, a control circuitry 32B generating a movement compensation signal 32C using the movement information of the optical system 31 from the movement determination unit 32A, and at least one MEMS unit 33 made by microfabrication technology and controlled by the control circuitry 32B with the movement compensation signal 32C to stabilize an image of an object O formed on the image plane 34.

The movement determination unit 32A can be an angular velocity sensor, a velocity sensor, an accelerometer, or any other conventional movement detection sensor; for example, vibration gyro sensor, MEMS sensor, piezoelectric sensor, image sensor, etc. The movement determination unit 32A can detect the pitch movement and/or yaw movement of the optical system 31. Also, the movement determination unit 32A can detect vertical and/or horizontal translation of the optical system 31. The number of movement determination units 32A depends on the Degree Of Freedom (DOF) of the motion of the optical system to be detected. The MEMS unit 33 comprises a substrate 33A, an MEMS mirror 33B movably connected to the substrate 33A and configured to have a motion comprising a rotation 35A, at least one actuation unit 33C configured to actuating the MEMS mirror 33B. The actuation unit 33C comprises a micro-actuator 33D and a micro-converter 33E. The micro-actuator 33D is disposed on the substrate 33A, communicatively coupled to the control circuitry 32B, and configured to have in-plane translation D in accordance with the movement compensation signal 32C from the control circuitry 32B. The micro-converter 33E has a primary end rotatably connected to the micro-actuator 33D, wherein the micro-actuator 33D with the in-plane translation D exerts a force on the primary end of the micro-converter 33E and the micro-converter 33E delivers the force to the MEMS mirror 33B to make the MEMS mirror 33B have a required rotation. The rotation 35A of the MEMS mirror 33B changes optical paths of light from an object O to an image plane 34 in order to stabilize the image of the object O formed on the image plane 34. The MEMS mirror 33B and the actuation unit 33C are fabricated on the substrate 33A by microfabrication technology. The general principle, structure and methods for making the discrete motion control of the MEMS unit 33 are disclosed in U.S. Pat. No. 7,330,297 issued Feb. 12, 2008 to Noh, U.S. Pat. No. 7,365,899 issued Apr. 29, 2008 to Gim, U.S. Pat. No. 7,382,516 issued Jun. 3, 2008 to Seo, U.S. Pat. No. 7,400,437 issued Jul. 15, 2008 to Cho, U.S. Pat. No. 7,411,718 issued Aug. 12, 2008 to Cho, U.S. Pat. No. 7,474,454 issued Jan. 6, 2009 to Seo, U.S. Pat. No. 7,488,082 issued Feb. 10, 2009 to Kim, U.S. Pat. No. 7,535,618 issued May 19, 2009 to Kim, U.S. patent application Ser. No. 11/347,590 filed Feb. 4, 2006, now U.S. Pat. No. 7,898,144, U.S. patent application Ser. No. 11/426,565 filed Jun. 26, 2006, now U.S. Pat. No. 7,777,959, U.S. patent application Ser. No. 11/534,613 filed Sep. 22, 2006, now U.S. Pat. No. 7,589,884, U.S. patent application Ser. No. 11/534,620 filed Sep. 22, 2006, now U.S. Pat. No. 7,589,885, U.S. patent application Ser. No. 11/693,698 filed Mar. 29, 2007, now U.S. Pat. No. 7,605,964, and U.S. patent application Ser. No. 11/762,683 filed Jun. 13, 2007, now abandoned, all of which are incorporated herein by references.

The optical system 31 with optical image stabilization can further comprise a lens unit 36A comprising at least one lens, having an object side and an image side, disposed between the MEMS unit 33 and the image plane 34 such that the MEMS unit 33 is positioned on the object side of the lens unit 36A, and configured to focus the light from the object O.

The optical system 31 comprising the movement determination unit 32A, control circuitry 32B, the MEMS unit 33, and the lens unit 36A can be served as a lens module capable of optical image stabilization.

The optical system 31 with optical image stabilization can further comprise an auxiliary lens unit 36B comprising at least one lens and disposed between the object O and the MEMS unit 33. The auxiliary lens 36B can be implemented to provide a desired field of view for the optical system 31.

The optical system 31 with optical image stabilization can further comprise at least one image sensor 34A disposed on an image side of the MEMS mirror 33B such that the image of the object is formed on the image sensor and configured to convert the image of the object to an electrical signal. The image sensor 34A can be used as a movement determination unit, wherein a movement of the optical system 31 is determined by analyzing the image data of the object O formed on the image sensor 34A.

The optical system 31 with optical image stabilization can further comprise a beam splitter. The beam splitter 36C can be disposed between the object O or the auxiliary lens unit 36B and the MEMS unit 33 as shown in FIG. 3b. The beam splitter 36C is configured to change optical paths of light.

Figure 3C:
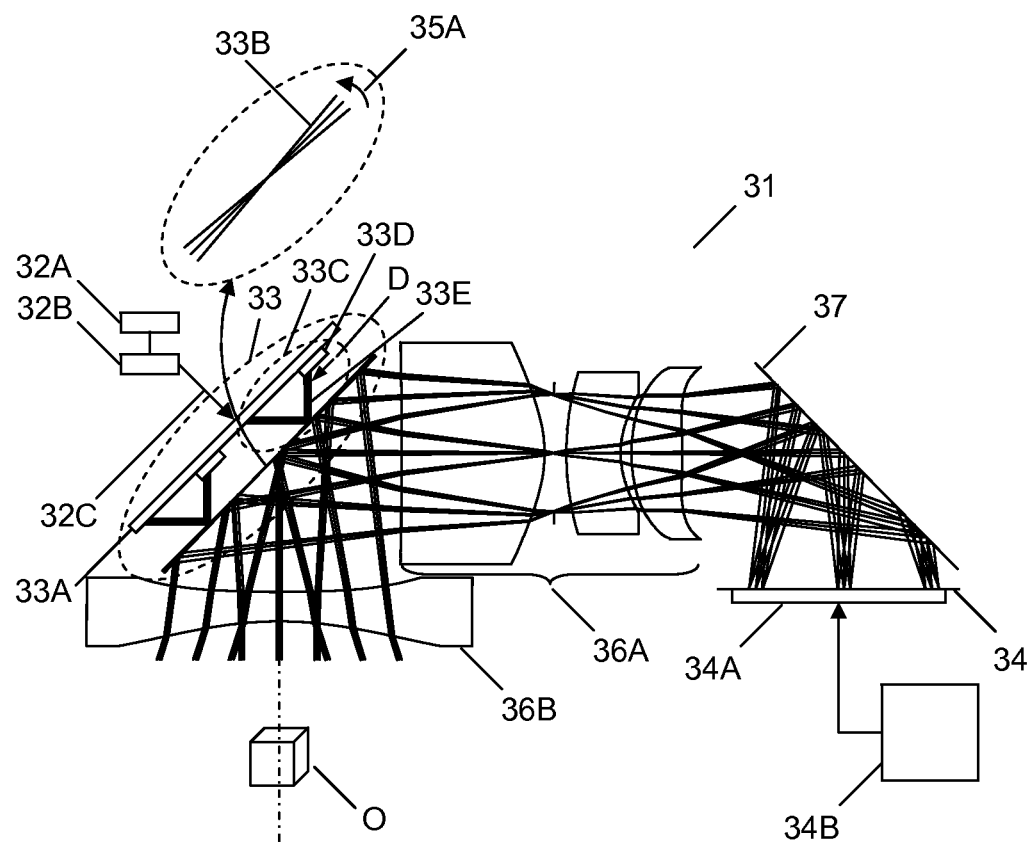

FIG. 3c shows the optical system 31 with optical image stabilization further comprising a reflective element 37 disposed between the MEMS mirror 33B and the image plane 34. The reflective element 37 can be a mirror to fold the optical paths of light. By folding the optical paths of light, the optical system 31 can be made compact. Furthermore, the movable reflective element 37 can be used to adjust the focus of the optical system. The movable reflective element 37 for focus adjustment can be a Micromirror Array Lens as will be shown in FIG. 6. The Micromirror Array Lens comprises a plurality of micromirrors. The Micromirror Array Lens is configured to changes the effective focal length of the optical system by changing its focal length and form an in-focus image on the image plane 34. The general principle, methods for making the micromirror array devices and Micromirror Array Lens, and their applications are disclosed in U.S. Pat. No. 7,057,826 issued Jun. 6, 2006 to Cho, U.S. Pat. No. 7,068,416 issued Jun. 27, 2006 to Gim, U.S. Pat. No. 7,077,523 issued Jul. 18, 2006 to Seo, U.S. Pat. No. 7,261,417 issued Aug. 28, 2007 to Cho, U.S. Pat. No. 7,315,503 issued Jan. 1, 2008 to Cho, U.S. Pat. No. 7,333,260 issued Feb. 19, 2008 to Cho, U.S. Pat. No. 7,339,746 issued Mar. 4, 2008 to Kim, U.S. Pat. No. 7,350,922 issued Apr. 1, 2008 to Seo, U.S. patent application Ser. No. 10/979,619 filed Nov. 2, 2004, now U.S. Pat. No. 7,768,571, U.S. patent application Ser. No. 11/076,688 filed Mar. 10, 2005, now abandoned, U.S. patent application Ser. No. 11/208,114 filed Aug. 19, 2005, now abandoned, U.S. patent application Ser. No. 11/208,115 filed Aug. 19, 2005, now abandoned, U.S. patent application Ser. No. 11/382, 707 filed May 11, 2006, now U.S. Pat. No.

7,742,232, and U.S. patent application Ser. No. 11/419,480 filed May 19, 2006, now U.S. Pat. No. 8,049,776, all of which are incorporated herein by references.

Alternatively, the reflective element 37 for focus adjustment can be a second MEMS unit as will be shown in FIG. 11. The second MEMS unit comprises at least one MEMS mirror configured to have a motion comprising an out-of-plane translation. The second MEMS unit is configured to change a distance between the lens unit and the image plane 34 by controlling the out-of-plane translation of the second MEMS mirror in order to form the in-focus image on the image sensor 34A. The MEMS unit used for focus adjustment is disclosed in U.S. Ser. No. 12/569,864 now U.S. Pat. No. 8,345,146, all of which are hereby incorporated by reference. The optical system can further comprise a beam splitter (not shown) positioned between the reflective element 37 and the image sensor 34A.

Instead using a reflective element to form an in-focus image on the image sensor 34A, the lens unit 36A comprising at least one movable lens can be implemented to change the effective focal length of the optical system 31 in order to form in-focus image on the image sensor 34A.

For automatic focus, the optical system 31 with optical image stabilization can further comprise at least one focusing status determination unit determining focusing status and providing focusing status information for movable reflective elements 37 or the lens unit 36A comprising the at least one movable lens, wherein the motions of the movable reflective elements 37 or movable lenses are automatically adjusted according to the focusing status information to form the in-focus image on the image sensor 34A.

The optical system 31 with optical image stabilization can further comprise an image processing unit 34B communicatively coupled to the image sensor 34A and analyzing the image data of the object O formed on the image sensor 34A. The image sensor 34A with the image processing unit 34B can be used as a movement determination unit 32A as will be shown in FIGS. 10c, 10d, 12c, and 12d. Also, the image sensor 34A with the image process unit 34B can be used as a focusing status determination unit as will be shown in FIGS. 10b and 12b.

Figure 4A:
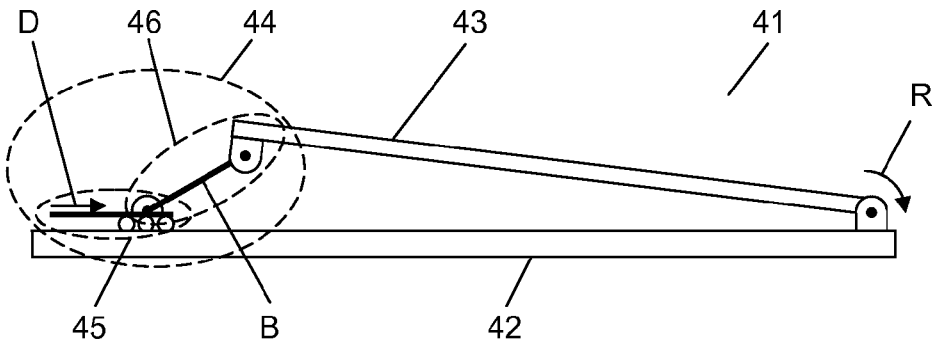
FIGS. 4a-4c are schematic diagrams of side views of various embodiments of the MEMS unit.
Figure 4B:
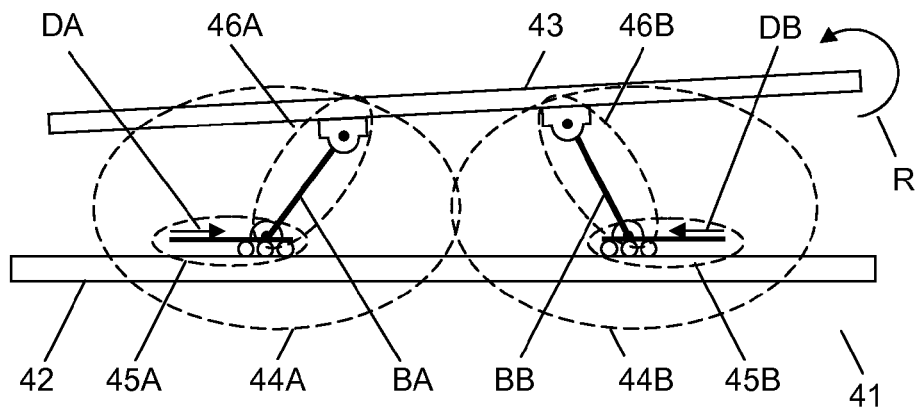
Figure 4C:
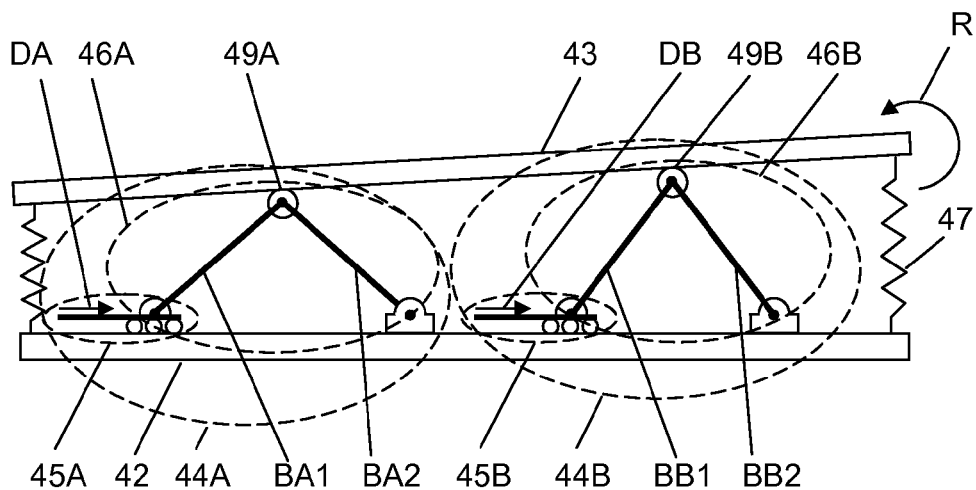

FIGS. 4a-4c are schematic diagrams of side views of various embodiments of the MEMS unit of the present invention, wherein the MEMS mirror is configured to have a motion comprising a rotation.

In conventional MEMS devices, the motion of the movable object is controlled by an attracting force between the movable object and electrodes, wherein the activated electrodes attract the movable object directly or indirectly. Since the motion of the movable object is determined by the activated electrodes and stoppers configured to stop the motion of the movable object, the number of steps that the movable object can have depends on the numbers of stoppers or electrodes. Also, surface force can cause a stiction problem between the movable object and the electrodes. To provide the MEMS mirror with a precise rotation control for the optical image stabilization, the present invention uses a micro-actuator having an in-plane translation and a micro-converter configured to convert the in-plane translation of the micro-actuator to a rotation of the MEMS unit. The in-plane translation of the micro-actuator is defined as a translation in the direction of an axis laying on the substrate surface.

The MEMS unit 41 of the present invention comprises a substrate 42, a MEMS mirror 43 movably connected to the substrate 42 and configured to have a motion comprising a rotation R, and at least one actuation unit 44 (or 44A, 44B) configured to actuating the MEMS mirror 43 and comprising a micro-actuator 45 (or 45A, 45B) and at least one micro-converter 46 (or 46A, 46B). The micro-actuator 45 is disposed on the substrate 42, communicatively coupled to a control circuitry, and configured to have in-plane translation D (or DA, DB) in accordance with a movement compensation signal from the control circuitry. The micro-converter 46 has a primary end rotatably connected to the micro-actuator 45. The micro-actuator 45 with the in-plane translation exerts a force on the primary end of the micro-converter 46, wherein the micro-converter 45 delivers the force to the MEMS mirror 43 to make the MEMS mirror 43 have a required rotation R. The rotation R of the MEMS mirror 43 changes optical paths of light from an object to an image plane in order to stabilize an image of the object formed on the image plane.

All structures in the MEMS unit 41 including the MEMS mirror 43, the micro-actuator 45, and the micro-converter 46 can be fabricated on the same substrate 42 by microfabrication technology. The micro-actuator 45 is preferably actuated by electrostatic force and controlled by applied voltage. The micro-actuator 45 is configured to have a discrete in-plane motion, which makes the MEMS mirror 43 have a discrete motion comprising a discrete rotation. The in-plane motion of the micro-actuator 45 has a plurality of discrete steps, which makes the MEMS mirror 43 have the rotation with a plurality of discrete steps. The micro-actuator is preferably a comb drive. Therefore, the movement compensation signal from the control circuitry is preferably a binary.

To stabilize the large amount of disturbance of the optical system, the MEMS mirror 43 should be capable of having a large range of rotation R. Also, to increase the image stabilization accuracy, the MEMS mirror 43 should be capable of having a small step size of rotation R. The range and step size of the rotation R of the MEMS mirror 43 of the present invention is determined by the range and step size of the in-plane translation D of the micro-actuator 45. The micro-actuator 45 of the present invention can have a large range of in-plane translation D since it can move along the substrate surface, which is one of the largest structures in the device. Also, the micro-actuator 45 of the present invention can be configured to have a small step size. In the present invention, at least one comb-drive is used as a micro-actuator 45. The comb-drive generates "coming and going" in-plane motion with a short stroke. The combination of two comb-drives can be used as a micro-actuator, wherein two comb-drives generate in-plane revolution and the in-plane revolution is converted to the linear in-plane translation D. The comb-drive can be designed to have a large range of the in-plane translation D with a small step size. The comb-drives are controlled by applied voltage.

Depending on applications, the MEMS unit can be configured to provide a motion comprising one degree-of-freedom rotation or two degrees-of-freedom rotation.

FIG. 4a shows an MEMS unit 41 having an actuation unit 44, wherein a micro-converter 46 comprises a beam B and is configured to convert the in-plane translations D of a micro-actuator 45 to the motion of the MEMS mirror 43. A first end of the beam B is a primary end and rotatably connected to a micro-actuator 45 and a second end of the beam B is rotatably connected to a MEMS mirror 43. The MEMS mirror 43 is rotatably connected to a substrate 42. The micro-actuator 45 has in-plane translation D in accordance with a movement compensation signal from a control circuitry. The micro-actuator 45 with the in-plane translation D exerts a force to the primary end of the beam B of the micro-converter 46 and induces the translations and rotations of the beam B. The translating and rotating beam B makes the MEMS mirror 43 have a required rotation R. The rotation R of the MEMS mirror 43 changes optical paths of light from an object to an image plane in order to stabilize an image of the object formed on the image plane. The MEMS unit 41 can further comprises at least one flexible member (not shown) connecting the MEMS mirror 43 and the substrate 42 and providing restoring force to the MEMS mirror 43. The MEMS unit 41 with an actuation unit can be used for the optical system that requires the MEMS mirror to have one DOF rotation for optical image stabilization.

FIG. 4b shows MEMS unit 41 comprising a plurality of actuation units 44A, 44B. The actuation units 44A, 44B comprise micro-actuators 45A, 45B disposed on a substrate 42 and configured to have in-plane translations DA, DB in accordance with a movement compensation signal from a control circuitry and micro-converters 46A, 46B comprising primary ends and configured to convert the in-plane translations DA, DB of the micro-actuators 45A, 45B to the motion of the MEMS mirror 43, respectively. The micro-converters 46A, 46B in the actuation units 44A, 44B comprise beams BA, BB, respectively. First ends of the beams BA, BB in the micro-converters 46A, 46B are the primary ends and rotatably connected to the micro-actuators 45A, 45B and the second ends of the beams BA, BB are rotatably connected to the MEMS mirror 43, respectively. The micro-actuators 45A, 45B with the in-plane translations DA, DB exert forces to the primary ends of the beams BA, BB of the micro-converters 46A, 46B, respectively. The in-plane translations DA, DB of the micro-actuators 45A, 45B induce the translations and rotations of the beams BA, BB and make the MEMS mirror 43 have a required rotation R. The rotation R of the MEMS mirror 43 changes optical paths of light from an object to an image plane in order to stabilize an image of the object formed on the image plane. Each actuation unit 44A, 44B is driven independently by the control circuitry. The MEMS unit 41 of FIG. 4b can further comprise at least one flexible member (not shown) configured to connect the MEMS mirror 43 and the substrate 42 and providing restoring force to the MEMS mirror 43. The MEMS unit 41 with a plurality of actuation units can be used for the optical system that requires the MEMS mirror to have one or more DOF rotation for optical image stabilization.

FIG. 4c shows an MEMS unit 41 having a plurality of actuation units 44A, 44B, wherein the actuation units 44A, 44B comprises micro-actuators 45A, 45B disposed on a substrate 42 and configured to have in-plane translations DA, DB in accordance with a movement compensation signal from a control circuitry and micro-converters 46A, 46B comprising primary ends and configured to convert the in-plane translations DA, DB of the micro-actuators 45A, 45B to a motion of the MEMS mirror 43, respectively. The micro-converters 46A, 46B in the actuation units 44A, 44B comprise pluralities of beams. The micro-converters 46A, 46B in the actuation units 44A, 44B comprise first beams BA1, BB1 and second beams BA2, BB2, respectively. First ends of the first beams BA1, BB1 in the micro-converters 46A, 46B are the primary ends and rotatably connected to the micro-actuators 45A, 45B and second ends of the first beams BA1, BB1 are rotatably connected to first ends of the second beams BA2, BB2, respectively. Second ends of the second beams BA2, BB2 are rotatably connected to the substrate 42. The micro-actuators 45A, 45B with the in-plane translations DA, DB exert forces to the primary ends of the first beams BA1, BB1 of the micro-converters 46A, 46B, respectively. In this configuration, the MEMS mirror 43 with a motion is configured to be pushed by pivot points 49A, 49B connecting the second ends of the first beams BA1, BB1 and the first ends of the second beams BA2, BB2, respectively. The MEMS unit 41 further comprises at least one flexible member 47 connecting the MEMS mirror 43 and the substrate 42 and providing restoring force to the MEMS mirror 43. Also, the restoring force of the flexible member 47 makes the pivot points 49A, 49B of the micro-converters 46A, 46B be in contact with the bottom of the MEMS mirror 43. The in-plane translations DA, DB of the micro-actuators 45A, 45B induce the translations and rotations of the beams BA1, BA2, BB1, BB2 and make the MEMS mirror 43 have a required rotation R. Each actuation unit 44A, 44B is driven independently by a control circuitry. The rotation R of the MEMS mirror 43 changes optical paths of light from an object to an image plane in order to stabilize an image of the object formed on the image plane. The MEMS unit 41 of FIG. 4c can minimize undesired in-plane translation of the MEMS mirror 43 by making the pivot points 49A, 49B slid or roll along the MEMS mirror 43.

Figure 5A:
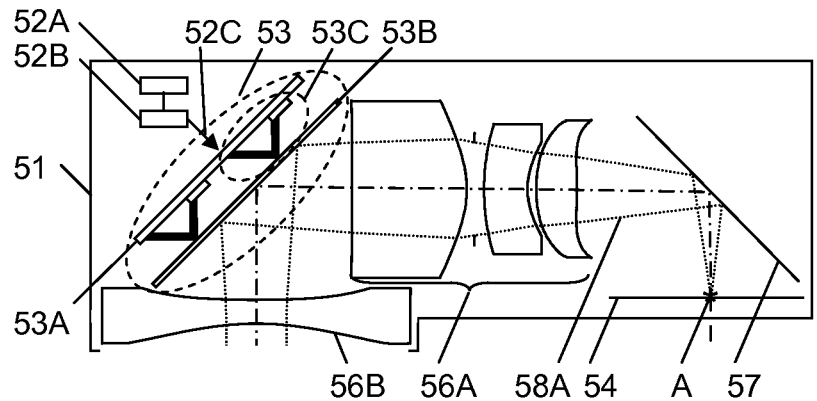
FIGS. 5a-5c show schematically how the optical system of the present invention performs the optical image stabilization using one embodiment of the present invention.
Figure 5B:
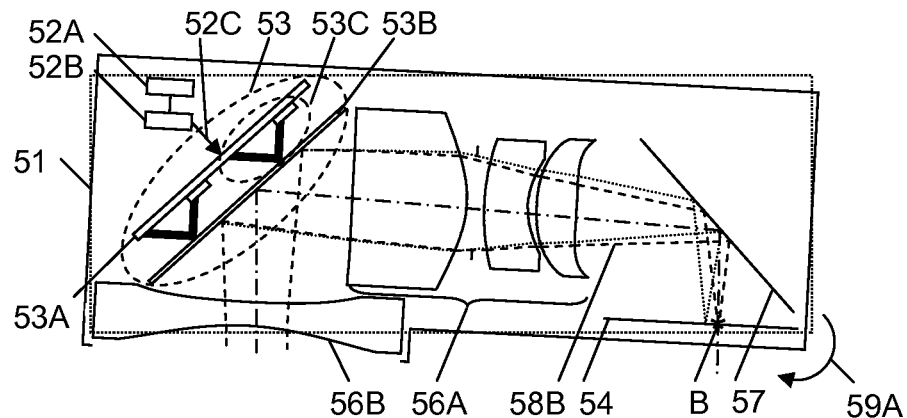
Figure 5C:
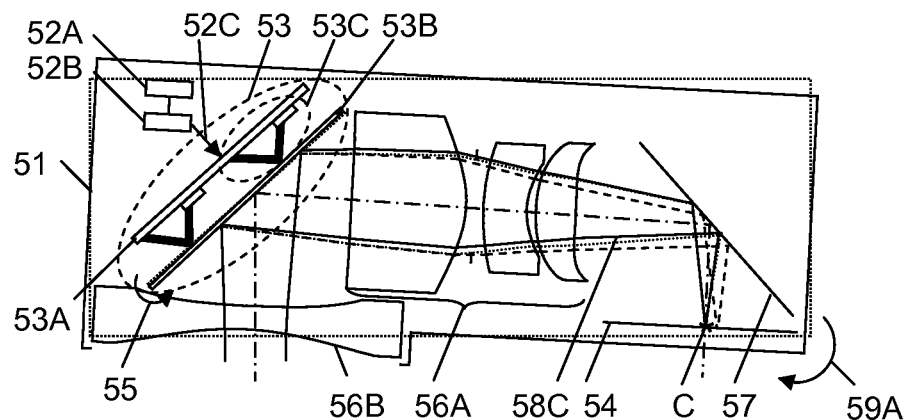

FIGS. 5a-5c show schematically how the optical system of the present invention performs the optical image stabilization using one embodiment of the present invention. The optical system 51 with optical image stabilization comprises at least one movement determination unit 52A determining a movement of the optical system 51, a control circuitry 52B generating a movement compensation signal 52C using the movement information of the optical system 51 from the movement determination unit 52A, and at least one MEMS unit 53 made by microfabrication technology and controlled by the control circuitry 52B with the movement compensation signal 52C to stabilize an image of an object formed on an image plane 54. The MEMS unit 53 comprises a MEMS mirror 53B having a motion comprising a rotation 55. The rotation 55 of the MEMS mirror 53B changes optical paths of light from the object to the image plane 54 in order to stabilize the image of the object formed on the image plane 54.

The optical system 51 with optical image stabilization can further comprise a lens unit 56A and an auxiliary lens unit 56B to satisfy the specification of the optical system 51. The lens unit 56A comprises at least one lens and is disposed between the MEMS unit 53 and the image plane 54 and configured to focus light from the object. The auxiliary lens 56B comprises at least one lens and is disposed between the object and the MEMS unit 53. The auxiliary lens 56B can be implemented to provide a desired field of view for the optical system 51. The optical system 51 with optical image stabilization can further comprise a reflective element 57 disposed between the MEMS mirror 53B and the image plane 54.

FIG. 5a shows the optical system 51 without movement. The optical system 51 without movement will produce clear images A of an object on the image plane 54. The optical paths of light are depicted by dotted lines 58A. FIG. 5b shows the optical system 51 having a rotational movement 59A during the imaging process but having no movement compensation. The optical system 51 has new optical paths 58B (dashed lines) of light due to the movement of the optical system 51. As the optical paths of light change from 58A to 58B during the imaging process, the image of the object traverses across the image plane 54 (from A to B) and the optical system 51 without movement compensation produces a blurred image on the image plane 54. FIG. 5c shows the optical system 51 with the movement compensation. To compensate the movement of the optical system 51, the movement determination unit 52A determines the movement of the optical system 51 and the control circuitry 52B generates a movement compensation signal 52C using the movement information of the optical system 51 from the movement determination unit 52A. The control circuitry 52B controls the actuation unit 53C of the MEMS unit 53 in accordance with the movement compensation signal 52C to make the MEMS mirror 53B have a required rotation 55. By the rotation 55 of the MEMS mirror 53B, optical paths of light change from 58A to 58C (solid lines). With the new optical paths 58C of light, the image C of the object formed on the image plane 54 is substantially closed to the image A of the object formed before the movement of the optical system 51. Therefore, the image of the object remains clear on the image plane 54 during the imaging process.

The optical system 51 with optical image stabilization can further comprise a beam splitter (not shown) positioned between the auxiliary lens unit 56B and the MEMS unit 53.

Figure 6A:
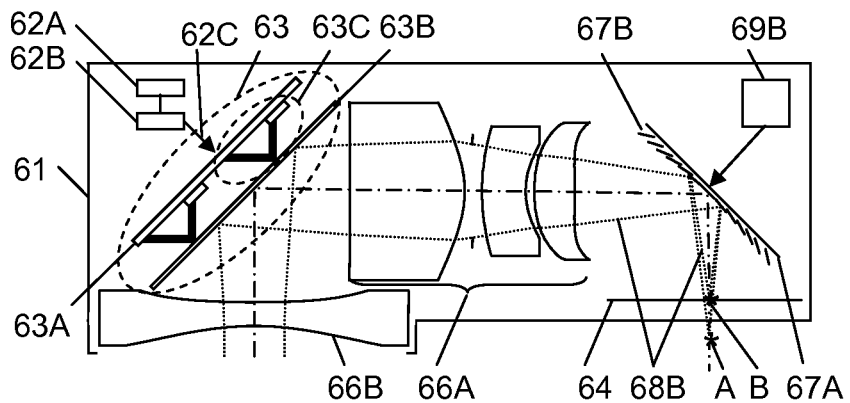
FIGS. 6a-6c show schematically how the optical system of the present invention performs the optical image stabilization and focus adjustment using a Micromirror Array Lens.
Figure 6B:
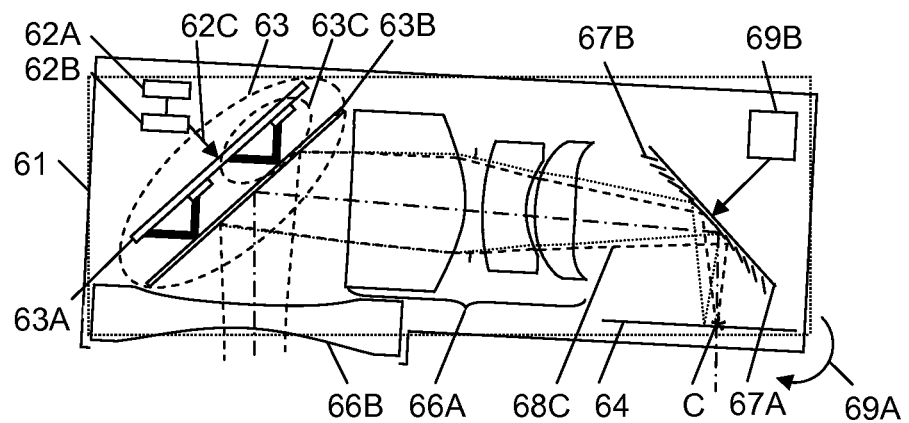
Figure 6C:
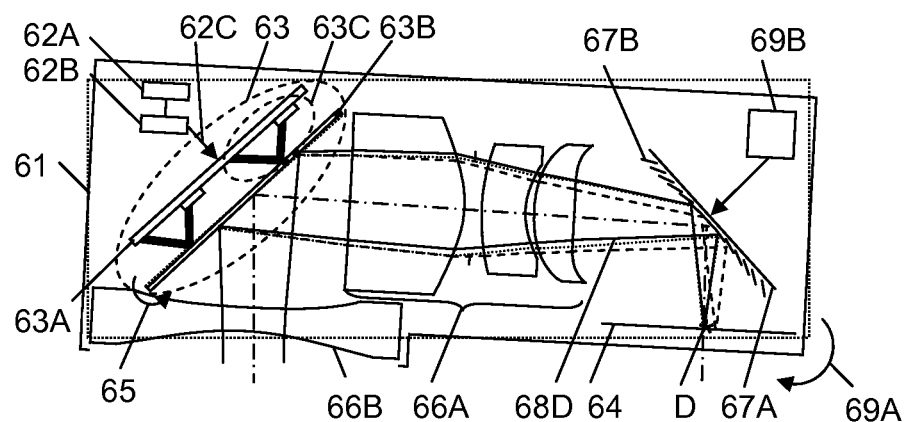

FIGS. 6a-6c show schematically how the optical system of the present invention performs the optical image stabilization and focus adjustment using one embodiment of the present invention. The optical system 61 with optical image stabilization comprises at least one movement determination unit 62A determining a movement of the optical system 61, a control circuitry 62B generating a movement compensation signal 62C using the movement information of the optical system 61 from the movement determination unit 62A, at least one MEMS unit 63 made by microfabrication technology and controlled by the control circuitry 62B with the movement compensation signal 62C to stabilize an image of an object formed on the image plane 64, and at least one Micromirror Array Lens 67A comprising a plurality of micromirrors 67B, disposed between the MEMS unit 63 and the image plane 64 and configured to change the effective focal length of the optical system 61 by changing its focal length and form an in-focus image on the image plane 64. The MEMS unit 63 comprises a MEMS mirror 63B having a motion comprising a rotation 65. The rotation 65 of the MEMS mirror 63B changes optical paths of light from the object to the image plane 64 in order to stabilize the image of the object formed on the image plane 64.

The optical system 61 with optical image stabilization can further comprise a lens unit 66A and an auxiliary lens unit 66B to satisfy the specification of the optical system 61. The lens unit 66A comprises at least one lens and is disposed between the MEMS unit 63 and the Micromirror Array Lens 67A and configured to focus light from the object. The auxiliary lens 66B comprises at least one lens and is disposed between the object and the MEMS unit 63. The auxiliary lens 66B can be implemented to provide a desired field of view for the optical system 61.

Figure 7:
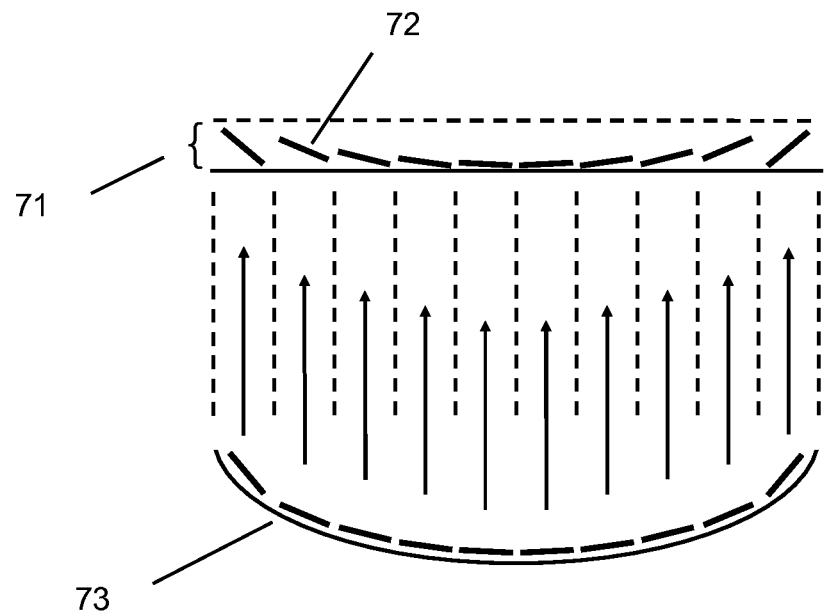
FIG. 7 is a schematic diagram showing the principle of the Micromirror Array Lens.

The Micromirror Array Lens 67B is a reflective Fresnel variable focal length lens or a diffractive Fresnel variable focal length lens that satisfies the focusing properties of a plurality of conventional single-bodied reflective lenses. FIG. 7 is a schematic diagram showing the principle of the Micromirror Array Lens. The Micromirror Array Lens 71 comprises a plurality of micromirrors 72 and replaces a conventional single-bodied reflective lens 73. By controlling motions of the micromirrors, the Micromirror Array Lens 71 can replace a plurality of conventional single-bodies reflective lenses.

To be a good lens, the lens must satisfy two conditions. One is the convergence condition that all light rays scattered from one point of an object should converge into one point of an image plane. The other is the phase matching condition that all converging light rays should have the same phase at the image plane. To satisfy the lens conditions, the surfaces of conventional single-bodied reflective lenses are formed to have all light rays scattered by one point of an object be converged into one point of the image plane and have the optical path lengths of all converging light rays be the same. The Micromirror Array Lens 73 satisfies these conditions in a different way.

Figure 8:
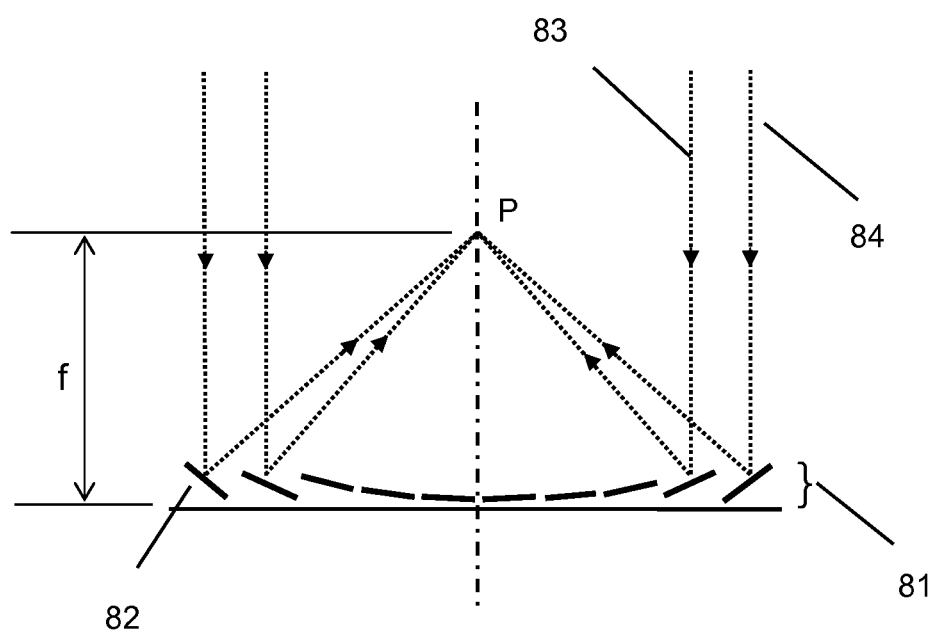
FIG. 8 is a schematic diagram showing a Micromirror Array Lens forming optical surface profiles to satisfy convergence condition and/or phase matching condition.

FIG. 8 is a schematic diagram showing a Micromirror Array Lens 81 forming optical surface profiles to satisfy convergence condition and/or phase matching condition. The optical surface profile of the Micromirror Array Lens 81 comprising micromirrors 82 satisfies the convergence condition, wherein arbitrary scattered light rays 83, 84 are converged into one point P on an image plane by adjusting the rotational and/or translational motions of each micromirror. Also, the surface profile of the Micromirror Array Lens 81 satisfies the phase matching condition, wherein the phases of all converging light rays at the converging point P on the image plane are adjusted to be the same by controlling the rotational and/or translational motion of each micromirror 82. Even though the optical path lengths of light rays 83, 84 converged by the Micromirror Array Lens 81 are different from those of an equivalent conventional single-bodied reflective lens, the same phase condition is satisfied by adjusting the phases of light rays 83, 84 because the phase of light is periodic. The Micromirror Array Lens 81 of the present invention satisfies the phase matching condition by adjusting the optical path length difference to be integer multiples of the wavelength of the light. The required maximum translational displacement is at least half wavelength of light. The Micromirror Array Lens 81 satisfies the convergence condition and the phase matching condition for each focal length.

In order to satisfy these conditions, the micromirrors 82 in the Micromirror Array Lens 81 are configured to have one DOF rotational motion, two degrees-of-freedom rotational motion, one DOF translational motion, one DOF rotational motion and one DOF translational motion, or two DOF rotational motion and one DOF translational motion. Each micromirror 82 in the Micromirror Array Lens 81 can be controlled independently to focus the image of the object on the image plane. Independent control of each micromirror is made possible by making electric circuits required for control with known microelectronics technologies and fabricating the circuits underneath the micromirrors using known microfabrication methods.

Figure 9:
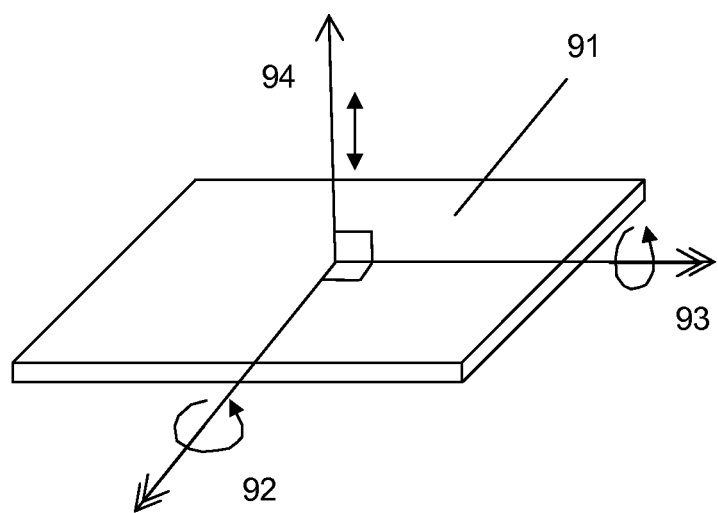
FIG. 9 is a schematic diagram showing a micromirror having two DOF rotational motion and one DOF translational motion.

FIG. 9 is a schematic diagram showing a micromirror 91 having two DOF rotational motion 92, 93 and one DOF translational motion 94. The Micromirror Array Lens comprising the micromirrors 91 with two DOF rotational motion 92, 93 and one DOF translational motion 94, which are controlled independently, makes a lens with arbitrary shape and/or size. Incident light is deflected to an arbitrary direction by controlling two DOF rotational motion 92, 93 and the phase of the incident light is adjusted by controlling one DOF translational motion 94 of each micromirror 91. Alternatively, incident light is deflected to an arbitrary direction by controlling two DOF rotational motion 92, 93 and one DOF translational motion 94 of each micromirror 91 and the phase of the incident light is adjusted by controlling two DOF rotational motion 92, 93 and one DOF translational motion 94 of each micromirror 91.

The general principle, methods for making the micromirror array devices and Micromirror Array Lens, and their applications are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,519 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, U.S. patent application Ser. No. 11/423,333 filed Jun. 9, 2006, all of which are incorporated herein by references.

Referring back to FIG. 6, the Micromirror Array Lens 67A is configured to change the effective focal length of the optical system 61 by changing its focal length and form an in-focus image on the image plane 64. The focal length of the Micromirror Array Lens 67A is changed by controlling the motions of the micromirrors 67B. The focus of the optical system 61 can be adjusted automatically by employing at least one focus measurement unit 69B. The focus measurement unit 69B determines focusing status and provides focusing status information for the Micromirror Array Lens 67A. The focus measurement unit 69B can be a distance measurement sensor measuring a distance between the object and the optical system 61 such as ultrasonic sound wave sensor and infrared light sensor. The focal length of the Micromirror Array Lens 67A is adjusted automatically in accordance with the distance information from the distance measurement sensor. Also, the focus measurement unit 69B can use at least one auto-focus image sensor determining the focusing status from at least a portion of the image of the object. The focal length of the Micromirror Array Lens 67A is adjusted automatically in accordance with the focusing status information from the auto-focus image sensor. Alternatively, the focal length of the Micromirror Array Lens 67A can be adjusted manually.

FIG. 6a shows a schematic diagram showing the Micromirror Array Lens 67A focusing the image automatically on the image plane 64. Without the Micromirror Array Lens 67A, the optical system 61 may form the image at A out of the image plane 64. To resolve this problem, the Micromirror Array Lens 67A changes the effective focal length of the optical system 61 by changing its focal length in accordance with the focus status information from the focus measurement unit 69B and forms the clear image B on the image plane 64. The micromirror 67B in the Micromirror Array Lens 67A is controlled to adjust the focal length of the Micromirror Array Lens 67A. The optical paths of light are depicted by dotted lines 68B.

FIG. 6b shows the optical system 61 having a rotational movement 69A during the imaging process but having no movement compensation. The optical system 61 has new optical paths 68C (dashed lines) of light due to the movement of the optical system 61. As the optical paths of light change from 68B to 68C during the imaging process, the image of the object traverses across the image plane 64 (from B to C) and the optical system 61 without movement compensation produces a blurred image on the image plane 64.

FIG. 6c shows the optical system 61 with the movement compensation. To compensate the movement of the optical system 61, the movement determination unit 62A determines the movement of the optical system 61. The control circuitry 62B generates a movement compensation signal 62C using the movement information of the optical system 61 from the movement determination unit 62A and controls the actuation unit 63C of the MEMS unit 63 in accordance with the movement compensation signal 62C to make the MEMS mirror 63B have a required rotation 65. By the rotation 65 of the MEMS mirror 63B, optical paths of light change from 68B to 68D (solid lines) of light. With the new optical paths 68D of light, the image D of the object formed on the image plane 64 is substantially closed to the focused image B of the object formed before the movement of the optical system 61. Therefore, the image of the object remains clear on the image plane 64 during the imaging process.

The micromirrors 67B in the Micromirror Array Lens 67A can be further controlled to adjust the focus after the optical image stabilization is performed if necessary.

In addition to focus adjustment, the micromirrors 67B of the Micromirror Array Lens 67A can be further controlled to correct the aberrations of the optical system 61. The aberrations can be caused by optical effects due to the medium between the object and its image or by defects of the optical system 61 that cause its image to deviate from the rules of paraxial imagery. In addition, since the micromirrors 67B in a Micromirror Array Lens 67A are reflective optical elements, the Micromirror Array Lens 67A has to be positioned obliquely with respect to the direction of incident light in the optical system 61 so as to reflect the incident light to the next optical element, which can cause a great deal of aberrations. In such an arrangement, the Micromirror Array Lens 67A is required to have aspherical surface profiles to compensate the aberrations while changing the focal length of the Micromirror Array Lens 67A. The Micromirror Array Lens 67A can be configured to form predetermined aspherical surface profiles by fabricating micromirrors 67B to have predetermined motions for each predetermined surface profile. Alternatively, the micromirrors 67B in the Micromirror Array Lens 67A can be fabricated such that each micromirror can be controlled independently to change the focal length of the Micromirror Array Lens 67A and correct the aberrations of the optical system 61.

The optical system 61 comprising the movement determination unit 62A, the lens unit 66A, the MEMS unit 63, and the Micromirror Array Lens 67A can be served as a lens module providing optical image stabilization and focusing function.

The optical system 61 comprising the movement determination unit 62A, the lens unit 66A, the MEMS unit 63, the Micromirror Array Lens 67A, and the focus measurement unit 69B can be served as a lens module providing optical image stabilization and automatic focus.

The optical system with optical image stabilization can further comprise at least one image sensor. FIGS. 10a-10d are schematic diagrams when the optical system of FIG. 6 has an image sensor. The optical system 101 with optical image stabilization comprises an image sensor 104A disposed on the image plane where the image of the object is formed. The Micromirror Array Lens 107A is controlled to focus the image of the object onto the image sensor 104A. The MEMS unit 103 is controlled to stabilize the image of the object on the image sensor 104A. Also, the Micromirror Array Lens 107A can be further controlled to correct the aberrations of the optical system 101 to provide high quality image.

Figure 10A:
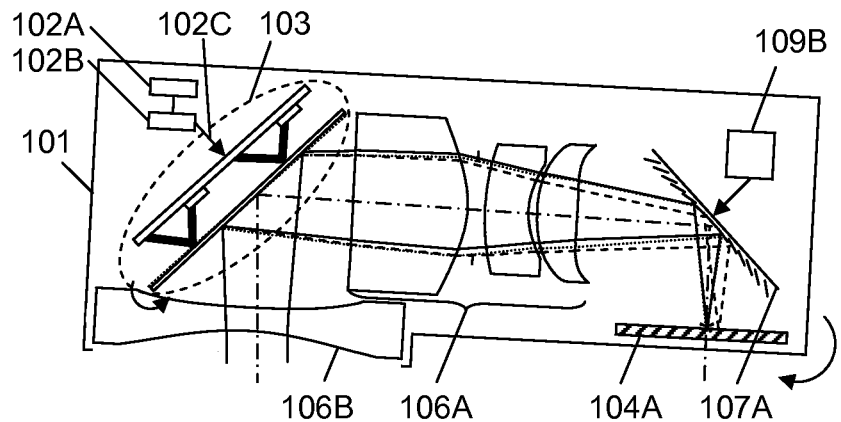
FIGS. 10a-10d are schematic diagrams when the optical system of FIG. 6 has an image sensor.

FIG. 10a shows an optical system 101 with optical image stabilization and automatic focus comprising a movement determination unit 102A, a control circuitry 102B, an auxiliary lens unit 106B, a MEMS unit 103, a lens unit 106A, a Micromirror Array Lens 107A, a focus measurement unit 109B, and an image sensor 104A.

Figure 10B:
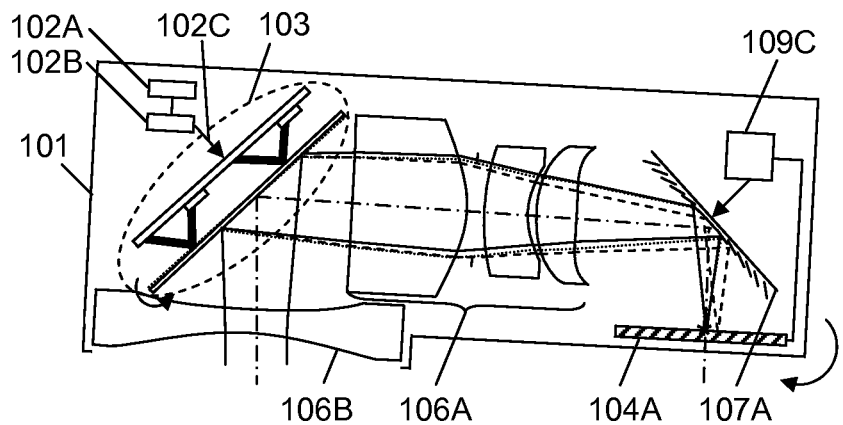

FIG. 10b shows an optical system 101 with optical image stabilization and automatic focus comprising a movement determination unit 102A, a control circuitry 102B, an auxiliary lens unit 106B, a MEMS unit 103, a lens unit 106A, a Micromirror Array Lens 107A, an image sensor 104A, and image processing unit 109C. The image processing unit 109C is communicatively coupled to the image sensor 104A and configured to determine focusing status by analyzing the image data from the image sensor 104A instead of using a focusing measurement unit. Furthermore, the image sensor 104A with the image processing unit 109C can be used along with an additional focus measurement unit to improve the focusing accuracy.

Figure 10C:
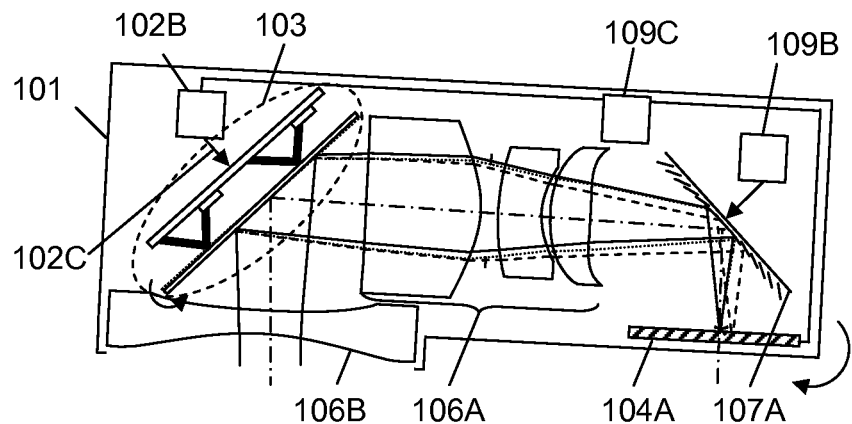

FIG. 10c shows an optical system 101 with optical image stabilization and automatic focus comprising control circuitry 102B, an auxiliary lens unit 106B, a MEMS unit 103, a lens unit 106A, a Micromirror Array Lens 107A, a focus measurement unit 109B, an image sensor 104A, and an image processing unit 109C. The image processing unit 109C is communicatively coupled to the image sensor 104A and configured to determine a movement of the optical system 101 by analyzing the image data from the image sensor 104A instead of using a movement determination unit. The control circuitry 102B generates a movement compensation signal 102C using the movement information of the optical system 51 from the image processing unit 109C. Furthermore, the image sensor 104A with the image processing unit 109C can be used along with an additional movement determination unit to improve the image stabilization accuracy.

Figure 10D:
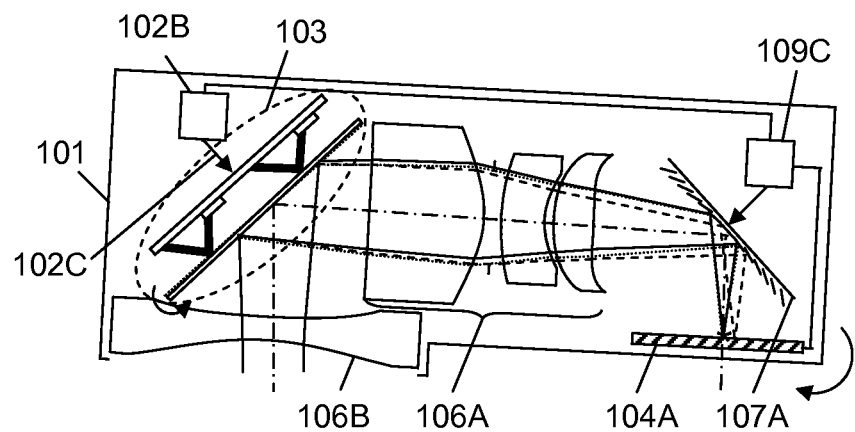

FIG. 10d shows an optical system 101 with optical image stabilization and automatic focus comprising a control circuitry 102B, an auxiliary lens unit 106B, a MEMS unit 103, a lens unit 106A, a Micromirror Array Lens 107A, an image sensor 104A, and an image processing unit 109C. The image processing unit 109C is communicatively coupled to the image sensor 104A and configured to determine focusing status and a movement of the optical system 101 by analyzing the image data from the image sensor 104A instead of using the focus measurement unit and the movement determination unit. Furthermore, the image sensor 104A with the image processing unit 109C can be used along with the focus measurement unit and/or the movement determination unit to improve the focusing accuracy and/or the image stabilization accuracy.

The optical systems 101 of FIGS. 10a-10d can be served as imaging modules providing optical image stabilization and automatic focus and can be implemented in various imaging devices such as a still camera, video camera, telescopes and other portable imaging devices.

Figure 11A:
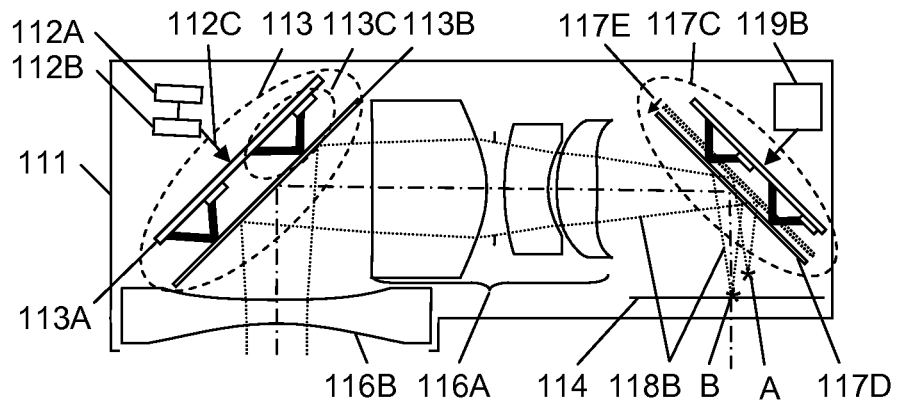
FIGS. 11a-11c show schematically how the optical system of the present invention performs the optical image stabilization and focus adjustment using an additional MEMS unit.
Figure 11B:
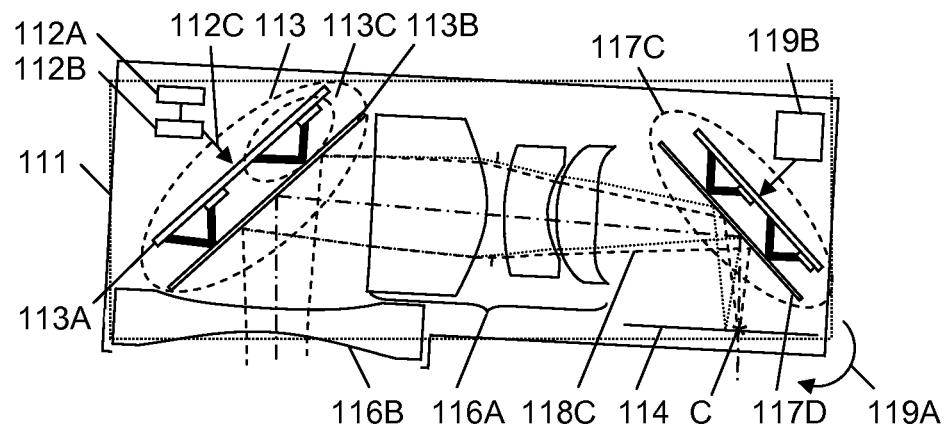
Figure 11C:
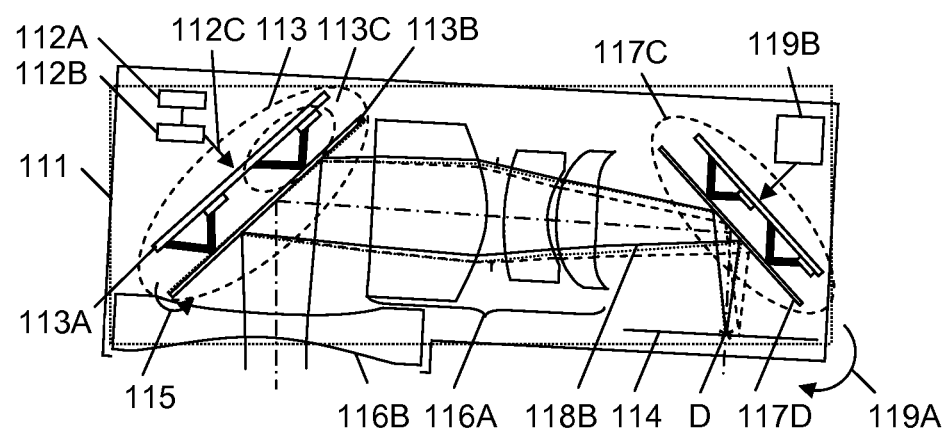

FIGS. 11a-11c show schematically how the optical system of the present invention performs the optical image stabilization and focus adjustment using another embodiment of the present invention. The optical system 111 with optical image stabilization comprises at least one movement determination unit 112A determining a movement of the optical system 111, a control circuitry 112B generating a movement compensation signal 112C using the movement information of the optical system 111 from the movement determination unit 112A, a first MEMS unit 113 made by microfabrication technology and controlled by the control circuitry 112B with the movement compensation signal 112C to stabilize an image of an object formed on the image plane 114, and a second MEMS unit 117C disposed between the first MEMS unit 113 and the image plane 114 and configured to adjust the focus of the optical system 111.

The first MEMS unit 113 comprises an MEMS mirror 113B having a motion comprising a rotation 115. The rotation 115 of the first MEMS mirror 113B is controlled to change optical paths of light from the object to the image plane 114 in order to stabilize the image of the object formed on the image plane 114.

The second MEMS unit 117C comprises an MEMS mirror 117D having a motion comprising an out-of-plane translation 117E. In this embodiment, the focus of the optical system 111 is adjusted by changing the distance between the object and the image plane 114 in stead of changing the effective focal length of the optical system 111. When the MEMS mirror 117D has the out-of-plane translation 117E, the distance between the object and image plane 114 can be changed. The second MEMS unit 117C is configured to change a distance between the object and the image plane 114 by controlling the out-of-plane translation of the MEMS mirror 117D in order to focus the image of the object on the image plane 114.

The optical system 111 with optical image stabilization can further comprise a lens unit 116A and an auxiliary lens unit 116B to satisfy the specification of the optical system 111. The lens unit 116A comprises at least one lens and is disposed between the first MEMS unit 113 and the second MEMS unit 117C and configured to focus light from the object. The second MEMS unit 117C can be configured to change a distance between the lens unit 116A and the image plane 114 by controlling the out-of-plane translation of the MEMS mirror 117D in order to focus the image of the object on the image plane 114. The auxiliary lens 116B comprises at least one lens and is disposed between the object and the first MEMS unit 113. The auxiliary lens 116B can be implemented to provide a desired field of view for the optical system 111.

The focus of the optical system 111 can be adjusted automatically by employing at least one focus measurement unit 119B. The focus measurement unit 119B determines focusing status and provides focusing status information for the second MEMS unit 117C. The out-of-plane translation of MEMS mirror 117D is adjusted automatically in accordance with the focusing status information from the focus measurement unit 119B.

FIG. 11a shows a schematic diagram showing the second MEMS unit 117C focusing the image automatically on the image plane 114. Without the second MEMS unit 117C, the optical system 111 may form the image at A out of the image plane 114. To resolve this problem, the out-of-plane translation 117E of the MEMS mirror 117D is controlled to change a distance between the object and the image plane 114. The out-of-plane translation 117E of the MEMS mirror 117D is changed in accordance with the focusing status information from the focus measurement unit 119B and a clear image B is formed on the image plane 114. The optical paths of light are depicted by dotted lines 118B.

The focus (or image) can be shifted when the out-of-plane translation 117E of the MEMS mirror 117D is used for automatic focus. In this case, the rotation of the MEMS mirror 117D can be further controlled to compensate focus shift with respect to the image plane 114. The second MEMS unit 113 of the present invention can be fabricated to provide the MEMS mirror 113B with rotation as well as out-of-plane translation.

FIG. 11b shows the optical system 111 having a rotational movement 119A during the imaging process but having no movement compensation. The optical system 111 has new optical paths 118C (dashed lines) of light due to the movement of the optical system 111. As the optical paths of light change from 118B to 118C during the imaging process, the image of the object traverses across the image plane 114 (from B to C) and the optical system 111 without movement compensation produces a blurred image on the image plane 114.

FIG. 11c shows the optical system 111 with the movement compensation. To compensate the movement of the optical system 111, the movement determination unit 112A determines the movement of the optical system 111. The control circuitry 112B generates a movement compensation signal 112C using the movement information of the optical system 111 from the movement determination unit 112A and controls the actuation unit 113C of the first MEMS unit 113 in accordance with the movement compensation signal 112C to make the MEMS mirror 113B have a required rotation 115. By the rotation of the MEMS mirror 113B, the optical paths of light change from 118D to 118D (solid lines). With the new optical paths 118D of light, the image D of the object formed on the image plane 114 is substantially closed to the focused image B of the object formed before the movement of the optical system 111. Therefore, the image of the object remains clear on the image plane 114 during the imaging process.

The MEMS mirror 117D in the second MEMS unit 117C can be further controlled to adjust the focus after the optical image stabilization is performed if necessary.

The optical system 111 comprising the movement determination unit 112A, the lens unit 116A, the first MEMS unit 113, and the second MEMS unit 117C can be served as a lens module providing optical image stabilization and focusing function.

The optical system 111 comprising the movement determination unit 112A, the lens unit 116A, the first MEMS unit 113, the second MEMS unit 117C, and the focus measurement unit 119B can be served as a lens module providing optical image stabilization and automatic focus.

The optical system 111 with optical image stabilization can further comprise at least one image sensor. FIGS. 12a-12d are schematic diagrams when the optical system of FIG. 11 has an image sensor. The optical system 121 with optical image stabilization comprises an image sensor 124A disposed on the image plane where the image of the object is formed. The out-of-plane translation 127E of the MEMS mirror 127D of the second MEMS unit 127C is controlled to focus the image of the object onto the image sensor 124A. The rotation of the MEMS unit 123 is controlled to stabilize the image of the object on the image sensor 124A. The rotation of the MEMS mirror 127D can be further controlled to compensate focus shift.

Figure 12A:
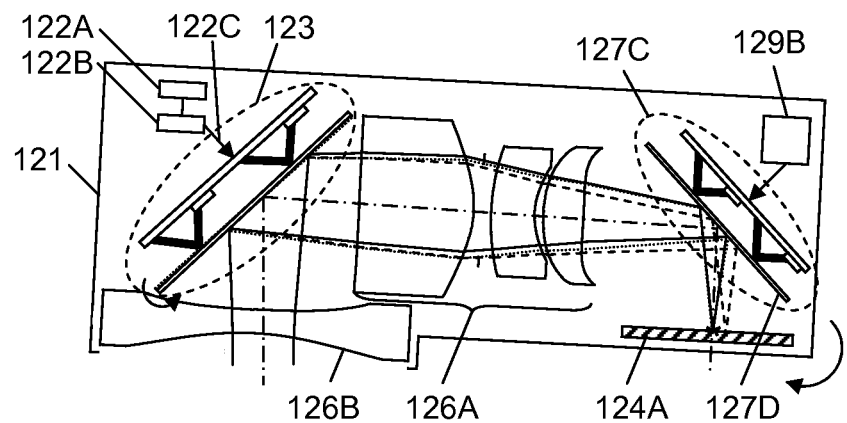
FIGS. 12a-12d are schematic diagrams when the optical system of FIG. 11 has an image sensor.

FIG. 12a shows an optical system 121 with optical image stabilization and automatic focus comprising a movement determination unit 122A, a control circuitry 122B, an auxiliary lens unit 126B, a first MEMS unit 123, a lens unit 126A, a second MEMS unit 127C, a focus measurement unit 129B, and an image sensor 124A.

Figure 12B:
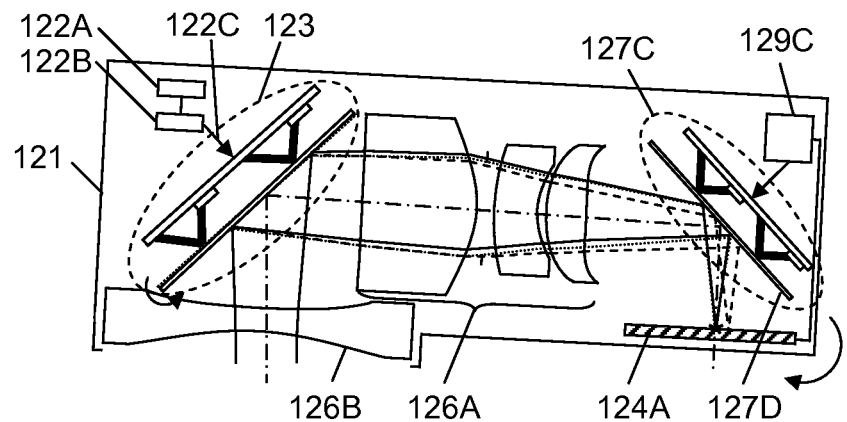

FIG. 12b shows an optical system 121 with optical image stabilization and automatic focus comprising a movement determination unit 122A, a control circuitry 122B, an auxiliary lens unit 126B, a first MEMS unit 123, a lens unit 126A, a second MEMS unit 127A, an image sensor 124A, and image processing unit 129C. The image processing unit 129C is communicatively coupled to the image sensor 124A and configured to determine focusing status by analyzing the image data from the image sensor 124A instead of using a focusing measurement unit. Furthermore, the image sensor 124A with the image processing unit 129C can be used along with an additional focus measurement unit to improve the focusing accuracy.

Figure 12C:
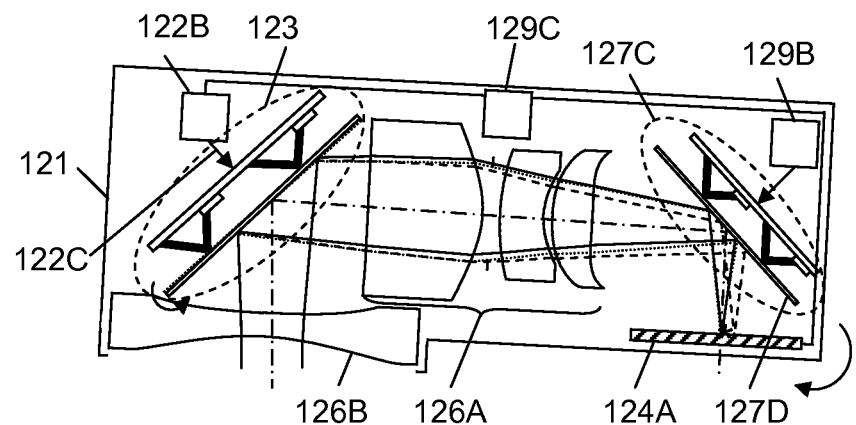

FIG. 12c shows an optical system 121 with optical image stabilization and automatic focus comprising control circuitry 122B, an auxiliary lens unit 126B, a first MEMS unit 123, a lens unit 126A, a second MEMS unit 127C, a focus measurement unit 129B, an image sensor 124A, and an image processing unit 129C. The image processing unit 129C is communicatively coupled to the image sensor 124A and configured to determine a movement of the optical system 121 by analyzing the image data from the image sensor 124A instead of using the movement determination unit. The control circuitry 122B generates a movement compensation signal 122C using the movement information of the optical system 121 from the image processing unit 129C. Furthermore, the image sensor 124A with the image processing unit 129C can be used along with an additional movement determination unit to improve the image stabilization accuracy.

Figure 12D:
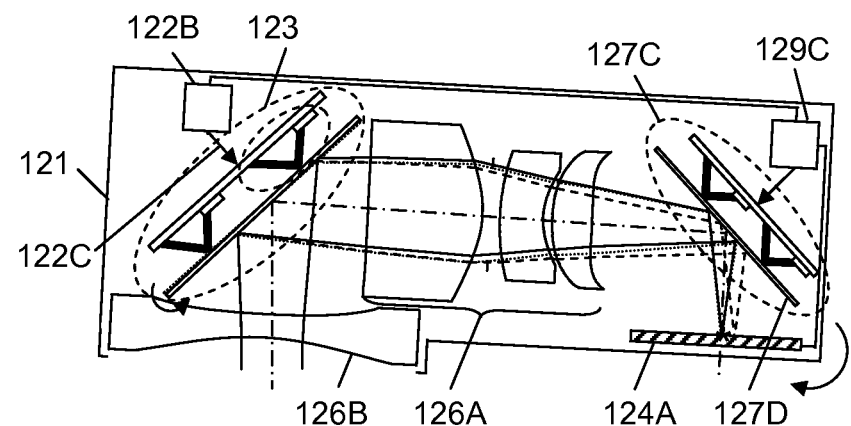

FIG. 12d shows an optical system 121 with optical image stabilization and automatic focus comprising control circuitry 122B, an auxiliary lens unit 126B, a first MEMS unit 123, a lens unit 126A, a second MEMS unit 127C, an image sensor 124A, and an image processing unit 129C. The image processing unit 129C is communicatively coupled to the image sensor 124A and configured to determine focusing status and a movement of the optical system 121 by analyzing the image data from the image sensor 124A instead of using the focus measurement unit and the movement determination unit. Furthermore, the image sensor 124A with the image processing unit 129C can be used along with the focus measurement unit and/or the movement determination unit to improve the focusing accuracy and/or the image stabilization accuracy.

The optical systems 121 of FIGS. 12a-12d can be served as imaging modules providing optical image stabilization and automatic focus and can be implemented in various imaging devices such as a still camera, video camera, telescopes and other portable imaging devices.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An optical system with optical image stabilization comprising:
at least one movement determination unit determining a movement information of the optical system;
a control circuitry generating a movement compensation signal using the movement information of the optical system from the movement determination unit; and
a Micro-Electro Mechanical System (MEMS) unit made by microfabrication technology and comprising a substrate, an MEMS mirror movably connected to the substrate and configured to have a motion comprising a rotation, and at least one actuation unit configured to actuating the MEMS mirror and comprising:
a micro-actuator disposed on the substrate, communicatively coupled to the control circuitry, and configured to have in-plane translation in accordance with the movement compensation signal; and
a micro-converter having a primary end rotatably connected to the micro-actuator, wherein the micro-actuator with the in-plane translation exerts a force on the primary end of the micro-converter and the micro-converter delivers the force to the MEMS mirror to make the MEMS mirror have a required rotation;
wherein the rotation of the MEMS mirror changes optical paths of light from an object to an image plane in order to stabilize an image of the object formed on the image plane.

2. The optical system with optical image stabilization of claim 1, wherein the micro-converter comprises at least one beam, wherein a first end of the beam is the primary end and a second end of the beam is rotatably connected to the MEMS mirror.

3. The optical system with optical image stabilization of claim 1, wherein the micro-converter comprises a first beam and a second beam, wherein a first end of the first beam is the primary end and a second end of the first beam is rotatably connected to a first end of the second beam, wherein a second end of the second beam is rotatably connected to the substrate, wherein the MEMS mirror is pushed by a pivot point connecting the second end of the first beam and the first end of the second beam in order to have the motion.

4. The optical system with optical image stabilization of claim 1, wherein the micro-converter is rotatably connected to the MEMS mirror.

5. The optical system with optical image stabilization of claim 1, wherein the micro-converter is rotatably connected to the substrate.

6. The optical system with optical image stabilization of claim 1, wherein the MEMS mirror is pushed by the micro-converter in order to have the motion.

7. The optical system with optical image stabilization of claim 1, wherein the MEMS mirror is rotatably connected to the substrate.

8. The optical system with optical image stabilization of claim 1, wherein the MEMS unit further comprises at least one flexible member connecting the MEMS mirror and the substrate and providing restoring force to the MEMS mirror.

9. The optical system with optical image stabilization of claim 1, wherein the micro-actuator is at least one comb-drive.

10. The optical system with optical image stabilization of claim 1, wherein the MEMS unit comprises a plurality of the at least one actuation units.

11. The optical system with optical image stabilization of claim 10, wherein each of the micro-actuators in the plurality of the at least one actuation units is driven independently by the control circuitry.

12. The optical system with optical image stabilization of claim 1, further comprising a lens unit comprising at least one lens, disposed between the MEMS unit and the image plane, and configured to focus the light from the object.

13. The optical system with optical image stabilization of claim 12, further comprising an auxiliary lens unit comprising at least one lens and disposed between the object and the MEMS unit.

14. The optical system with optical image stabilization of claim 1, further comprising a reflective element disposed between the MEMS unit and the image plane.

15. The optical system with optical image stabilization of claim 14, wherein the reflective element is movable and configured to adjust a focus of the optical system.

16. The optical system with optical image stabilization of claim 15, wherein the movable reflective element is a Micromirror Array Lens, wherein the Micromirror Array Lens is a variable focus lens configured to change an effective focal length of the optical system.

17. The optical system with optical image stabilization of claim 15, wherein the movable reflective element is a second MEMS unit, wherein the second MEMS unit comprises at least one MEMS mirror having a motion comprising an out-of-plane translation and is configured to change a distance between the object and the image plane by controlling the out-of-plane translation of the MEMS mirror.

18. The optical system with optical image stabilization of claim 17, wherein the MEMS mirror is configured to have a rotation in order to compensate focus shift.

19. The optical system with optical image stabilization of claim 15, further comprising at least one focus measurement unit determining focusing status and providing focusing status information for the movable reflective element in order to adjust the focus of the optical system automatically.

20. The optical system with optical image stabilization of claim 1, further comprising at least one image sensor disposed on an image side of the MEMS mirror such that the image of the object is formed on the image sensor and configured to convert the image of the object to an electrical signal.

21. The optical system with optical image stabilization of claim 20, further comprising on image processing unit communicatively coupled to the image sensor and analyzing image data from the image sensor.

22. The optical system with optical image stabilization of claim 21, wherein the image sensor with the image process unit is a focus status determination unit.

23. The optical system with optical image stabilization of claim 1, further comprising a beam splitter positioned between the object and the MEMS mirror.

24. The optical system with optical image stabilization of claim 14, further comprising a beam splitter positioned between the reflective element and the image plane.

25. The optical system with optical image stabilization of claim 1, wherein the movement compensation signal is binary.

* * * * *